(12) United States Patent
Grenaway et al.

(10) Patent No.: US 8,627,846 B2
(45) Date of Patent: Jan. 14, 2014

(54) PRESSURE REGULATOR HAVING AN INTEGRAL PILOT AND SELF-RELIEVING MECHANISM

(75) Inventors: John R. Grenaway, Edwardsville, IL (US); Mark K. Hamm, Cullman, AL (US)

(73) Assignee: Pentair Valves & Controls US LP, Golden Valley, MN (US)

( * ) Notice: Subject to any disclaimer, the term of this patent is extended or adjusted under 35 U.S.C. 154(b) by 483 days.

(21) Appl. No.: 12/940,314

(22) Filed: Nov. 5, 2010

(65) Prior Publication Data

US 2011/0108137 A1    May 12, 2011

Related U.S. Application Data

(60) Provisional application No. 61/258,766, filed on Nov. 6, 2009.

(51) Int. Cl.
*F16K 31/12* (2006.01)
(52) U.S. Cl.
USPC .......................................................... 137/491
(58) Field of Classification Search
USPC ................... 137/116.5, 488, 489, 491, 489.5, 137/505.11
See application file for complete search history.

(56) References Cited

U.S. PATENT DOCUMENTS

| | | | | |
|---|---|---|---|---|
| 3,265,303 A | * | 8/1966 | Harris | 137/491 |
| 4,730,638 A | * | 3/1988 | Hazelton | 137/202 |
| 5,931,182 A | | 8/1999 | Craft et al. | |
| 6,068,014 A | * | 5/2000 | Tomita | 137/116.5 |
| 6,554,017 B2 | | 4/2003 | Berger | |
| 7,017,605 B2 | | 3/2006 | Stroud | |
| 7,134,447 B2 | | 11/2006 | Boyer | |

\* cited by examiner

*Primary Examiner* — Eric Keasel
(74) *Attorney, Agent, or Firm* — Quarles & Brady LLP

(57) ABSTRACT

A high flow pressure regulator valve is disclosed having an integral pilot valve. The disclosed valve includes a pressure regulating portion including inlet and outlet ports, a valve seat, valve disc and a spring for biasing the valve disc into engagement with the valve seat. The valve also includes a pilot valve portion positioned on the flow regulating portion. The pilot valve portion includes a pilot spring, a diaphragm and a pusher post. One end of the pusher post is positioned toward the diaphragm and a second end is disposed within an annulus region. The valve further includes a pressure path that enables selective fluid communication between the outlet port, the annulus, an inner chamber region disposed beneath the diaphragm, and an intermediate chamber disposed above the valve disc. Other embodiments are disclosed and claimed.

18 Claims, 7 Drawing Sheets

PRESSURE REGULATOR HAVING AN INTEGRAL PILOT AND SELF-RELIEVING MECHANISM

CROSS-REFERENCE TO RELATED APPLICATIONS

This is a non-provisional of provisional patent application Ser. No. 61/258,766, filed Nov. 6, 2009, the entirety of which application is incorporated herein by reference.

BACKGROUND OF THE INVENTION

1. Field of the Invention

Embodiments of the invention generally relate to the field of pressure regulating valves, and more particularly to pressure regulating valves that are capable of passing high flow rates with minimal droop with low pressure differential across the valve. In addition, embodiments of the invention relate to pressure regulating valves having an automatic downstream overpressure bleed mechanism.

2. Discussion of Related Art

Further, current high flow rate regulating valves are often manufactured from separate diaphragm and pilot regulator valves that are piped or mounted together. A disadvantage of such an arrangement is that it requires the coupling of two separate valves, which increases the total number of components required, as well as the total number of joints and consequently potential leaks. Thus, it would also be desirable to provide a regulator design that incorporates a regulator and a pilot regulator in a single valve.

Further, current high flow regulator valves often have a large main diaphragm to provide desired sensitivity to small pressure differentials and to accommodate a desired flow rate. The larger the diaphragm, the more sensitive the regulator is to small pressure differentials. Thus, in some valves, the main diaphragm may be multiple times greater than the seat diameter. It would be desirable to provide a regulator design that is sensitive to small pressure differentials, but does not require a large main diaphragm.

Further, current pressure regulating valves often have less than desirable droop characteristics. Generally, droop is the deviation of pressure from the set value of a valve as the valve travels from a minimum flow position to a full flow position. It would be desirable to provide a regulator design capable of passing high flow rates with small droop characteristics.

Further, pressure regulating valves are used in industrial applications to respond to various pressure changes within a system. Such valves are often isolated in a piping system by upstream and downstream isolation valves. During system startup, if the downstream side of a pressure regulator is deadheaded and the upstream isolation valve is opened to pressurize the regulator inlet, the regulator's pressure plate can quickly lift, providing a "burp" of high pressure air downstream. A similar "burp" of high pressure air can also be caused by rapid closing of the downstream isolation valve while flowing at high rates. This high pressure "burp" can provide a false sense of what pressure the valve is regulating. In such instances, readings taken from a downstream pressure gauge may give the appearance that the regulator is not set properly, even if no adjustment is actually required.

To combat this problem in current valves, downstream pressure is manually bled off to reduce the outlet pressure to the actual set pressure of the regulator. This manual process, however, can be time consuming, and thus it would be desirable to provide an inexpensive method for automatically bleeding off downstream excess pressure in a regulator valve to avoid the aforementioned problems.

SUMMARY OF THE INVENTION

Some embodiments of the disclosed device include a piston style main pressureregulator having a small integral pilot valve mechanism to deliver high flow rates with small droop characteristics. Such embodiments provide a less costly, highly reliable, valve as compared with conventional large diaphragm style regulators which required separately connected pilot regulators.

Some embodiments of the disclosed device include a pressure regulator having a main piston comprising a main pressure plate. The main regulator may operate like a piston-style regulator, in which the piston is about the same size as the seat, while still providing a desired sensitivity to small pressure differentials. The disclosed design provides an advantage over current regulators that use large main diaphragms to provide high sensitivity to small differential pressures.

The disclosed pressure regulator incorporates a self-relieving mechanism in a high flow pressure regulator valve. In some embodiments, the disclosed valve also addresses the need to bleed off downstream excess pressure automatically through a unique and inexpensive method.

A pressure regulating valve is disclosed, comprising a pressure regulating portion including a body having inlet and outlet ports, a valve seat and a valve disc, and an intermediate chamber enclosing a first spring for biasing the valve disc into engagement with the valve seat. The valve may also include a pilot portion positioned on the pressure regulating portion. The pilot portion may comprise a pilot spring, a diaphragm, a pusher post axially fixed to a bleed-seat, and a sub-screw having an axial bore. The sub-screw may be axially fixed to the diaphragm. The pilot portion may further include a seal member disposed between the bleed-seat and the sub-screw. The body may further include a pressure path for fluid communication between the outlet port and an inner chamber region disposed beneath the diaphragm.

A pressure regulating valve is disclosed, comprising a pressure regulating portion including inlet and outlet ports, a valve seat, a valve disc, and a top chamber enclosing a first spring for biasing the valve disc into engagement with the valve seat. The valve may also include a pilot control portion positioned on the flow regulating portion. The pilot control portion may comprise a pilot spring, a diaphragm and a pusher post. A first end of the pusher post may be positioned toward the diaphragm and a second end of the pusher post may be disposed within an annulus in the top chamber. The valve may further include a pressure path enabling selective fluid communication between the outlet port, the annulus, an inner chamber region disposed beneath the diaphragm, and an intermediate chamber disposed above the valve disc.

BRIEF DESCRIPTION OF THE DRAWINGS

The accompanying drawings illustrate exemplary embodiments of the disclosed device so far devised for the practical application of the principles thereof, and in which.

DESCRIPTION OF EMBODIMENTS

Figure 1:
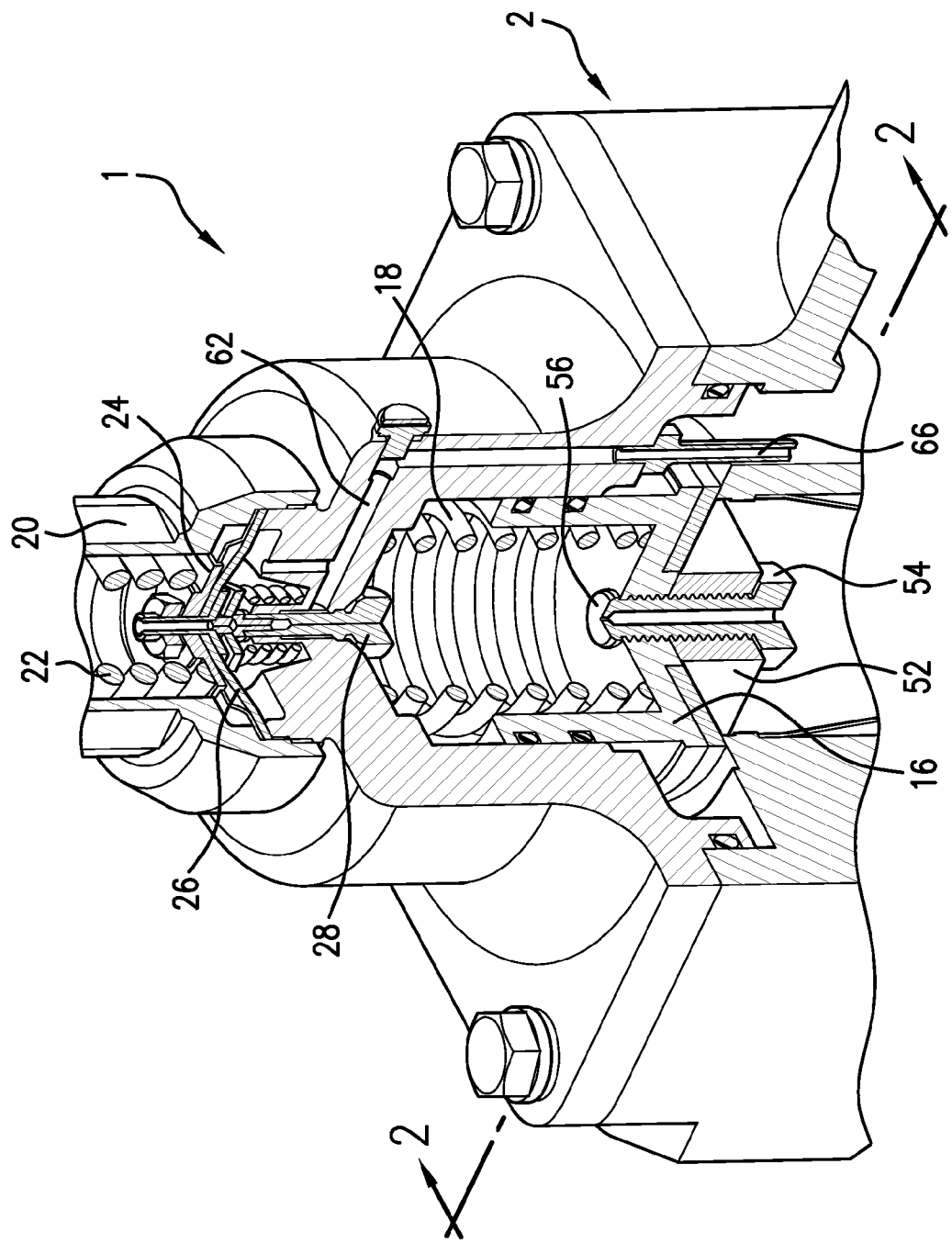
FIG. 1 is a perspective cutaway view of the disclosed valve.

The following description is intended to be read in connection with the accompanying drawings, which are to be considered part of the entire written description of this invention. In the description, relative terms such as "above," "below," "up," "down," "top," "bottom," "lower," "upper," "horizontal," "vertical," as well as derivative thereof (e.g., "horizontally," "downward," "upward," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship in which structures are secured or attached to one another either directly or indirectly through intervening structures, as well as both movable or rigid attachments or relationships, unless expressly described otherwise.

Figure 2:
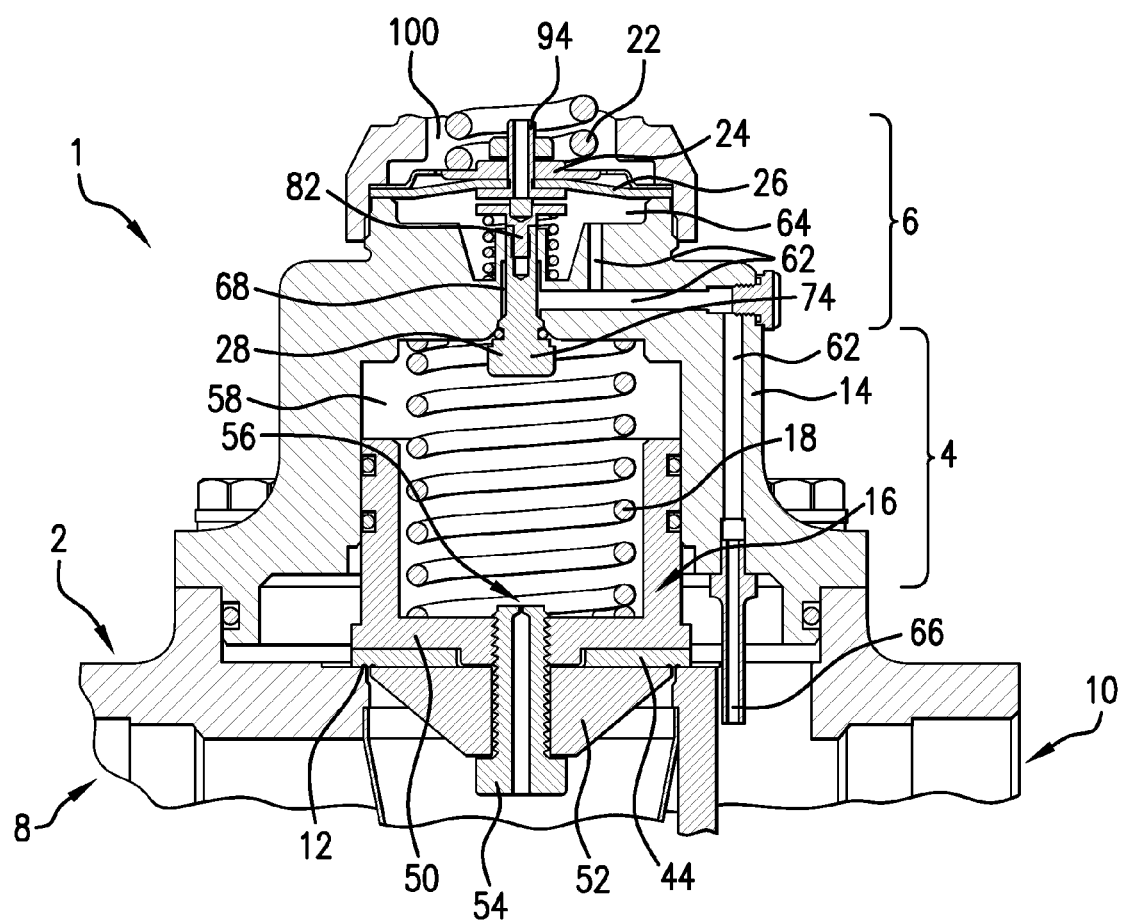
FIG. 2 is a cross-section view of the valve of FIG. 1, taken alone line 2-2.

Referring to FIGS. 1 and 2, the disclosed regulating valve 1 generally comprises a body 2, a top chamber assembly 4, and a pilot spring chamber assembly 6. The body 2 generally comprises inlet and outlet ports 8, 10, and a seat 12. The top chamber assembly 4 generally includes a top chamber 14, a main pressure plate subassembly 16 and a pressure spring 18, where the pressure spring 18 is positioned to bias the pressure plate subassembly 16 into engagement with the seat 12. The pilot spring chamber assembly 6 generally includes a pilot spring chamber 20, a pilot spring 22, a second pressure plate 24, a diaphragm 26, and a pusher post 28. The pilot spring 22 is positioned to bias the second pressure plate 24 downward to maintain a pusher post 28 in a desired position with respect to the top chamber assembly 4.

The main pressure plate subassembly 16 is vertically movable within the top chamber 14 to enable a disc 44, positioned at one end of the subassembly, to move into and out of engagement with the seat 12 on the body 2. The disc 44 is mounted to one end of the main pressure plate 50. A cone washer 52 may be provided at the same end of the pressure plate 50, and may be fixed to the pressure plate via a cap screw 54. The cap screw 54 may have an orifice 56 configured to enable controlled fluid communication between the inlet port 8 of the body 2 and an intermediate chamber region 58 of the top chamber assembly 4.

The top chamber assembly 4 may include a pressure path 62 that provides fluid communication between the outlet port 10 of the body 2 and an inner chamber region 64 of the pilot spring chamber assembly 6. A first end of the pressure path 62 may include a sense port 66 that extends downward into the body 2 adjacent to the outlet port 10. A second end of the pressure path 62 terminates in an annulus 68 that surrounds a portion of the pusher post 28 which is disposed within the top chamber 14. A third end of the pressure path 62 terminates in the inner chamber region 64 of the pilot spring chamber assembly 6.

Figure 3:
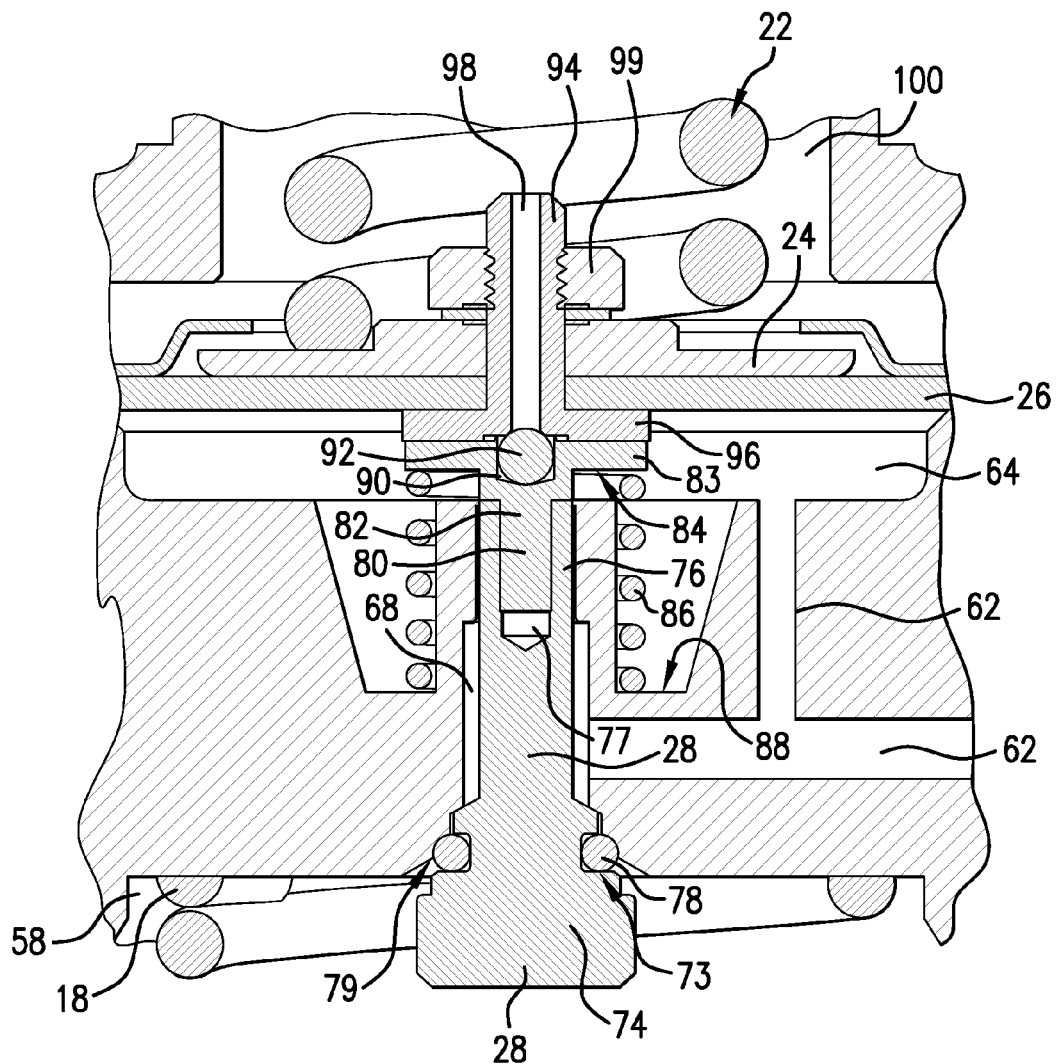
FIG. 3 is a detail view of the cross-section of FIG. 2.
Figure 6:
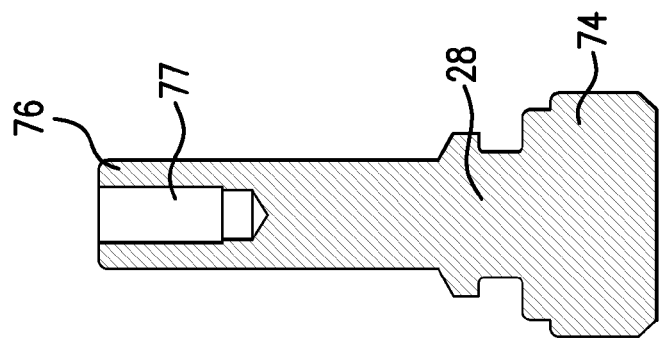
FIG. 6 is a cross-section view of an exemplary pusher post for use in the valve of FIG. 1.
Figure 5:
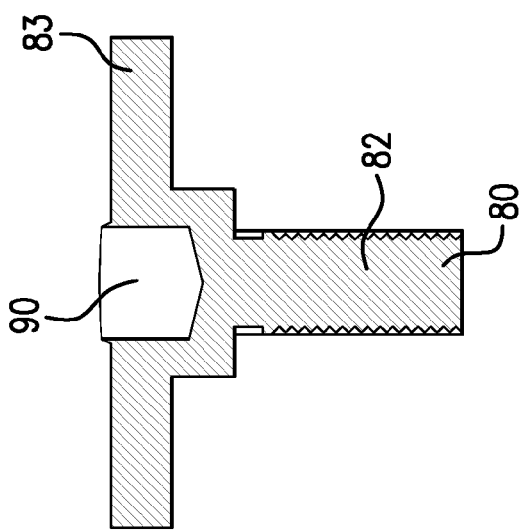
FIG. 5 is a cross-section view of an exemplary bleed seat for use in the valve of FIG. 1.
Figure 7:
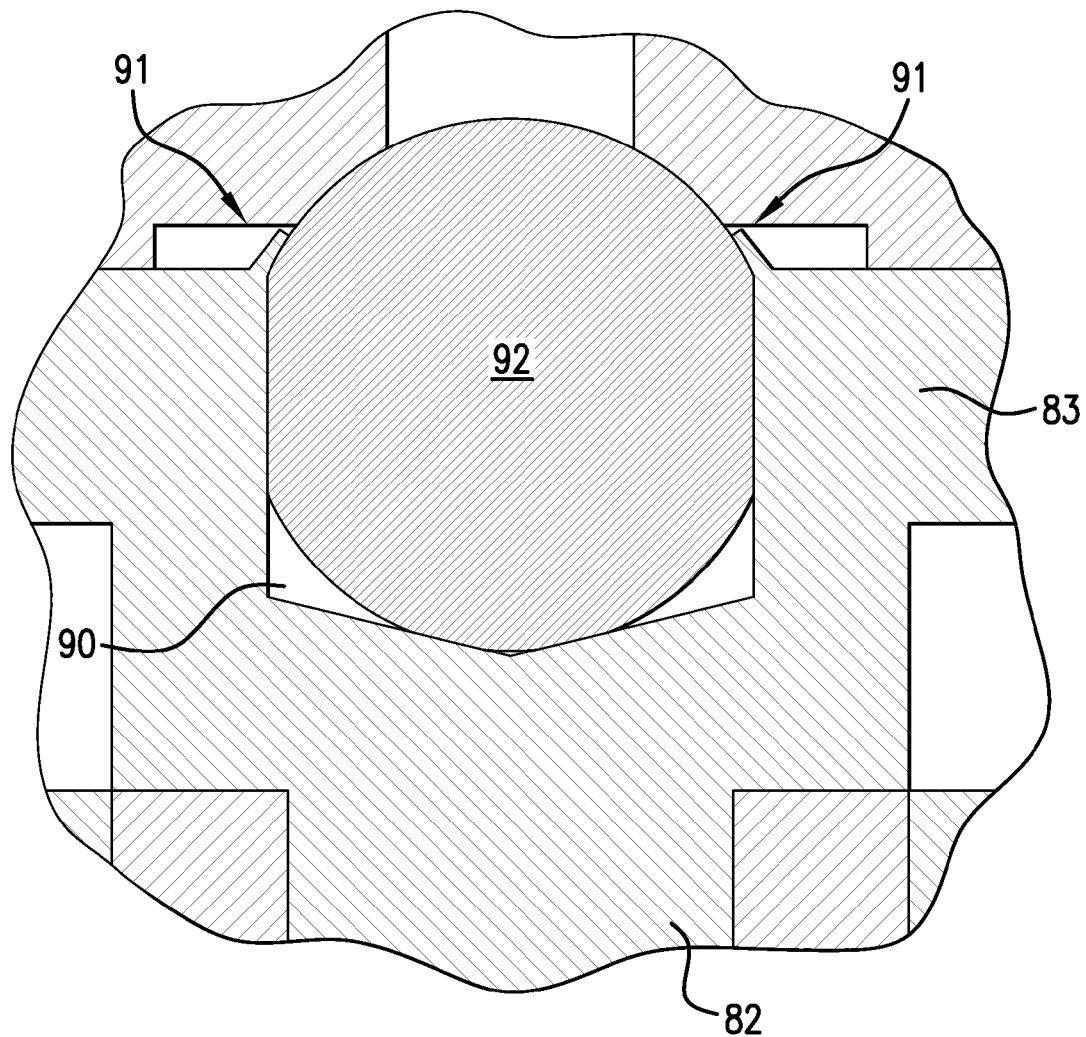
FIG. 7 is a cross section view of an exemplary seal arrangement for use in the valve of FIG. 1.

Referring now to FIG. 3, the self-relief mechanism will be described in greater detail. As can be seen, a first portion 74 of the pusher post 28 (see FIG. 6) resides within the intermediate chamber region 58 of the top chamber assembly 4. An elastomeric ring 78 is positioned on a shoulder region 73 of the first portion 74 of the pusher post 28, to enable selective sealing of the annulus 68 and the intermediate chamber region 58. A second portion 76 of the pusher post 28 comprises a recess 77 which receives a projection portion 80 of a bleed seat 82 (see FIG. 5). In one embodiment corresponding threads in the recess 78 and on the projection portion 80 cooperate to fix the two pieces axially with respect to each other. The bleed seat 82 extends within the inner chamber region 64 of the spring chamber assembly 6, and comprises a flange portion 83 disposed on an end of the seat opposite the projection portion 80. A bottom face 84 of the flange portion 83 engages a second pilot spring 86 such that the spring 86 is captured between the flange portion 83 and a bottom surface 88 of the inner chamber region 64. The flange portion 83 further comprises a central recess 90 configured to receive a seal member 92, which in the illustrated embodiment is an elastomeric ball (see FIG. 7) captured in the recess 90 via plurality of burnished tabs 91. The seal member 92 may take any of a variety of other forms (e.g., conical, cylindrical, gasket or o-ring), and need not be a ball shape or an elastomer. Thus, in one embodiment, the seal member 92 may be a cylindrical element made of relatively soft polymer material (e.g., 95 durometer) that can be deformed to conform to the physical contours of the pieces being sealed.

Figure 4:
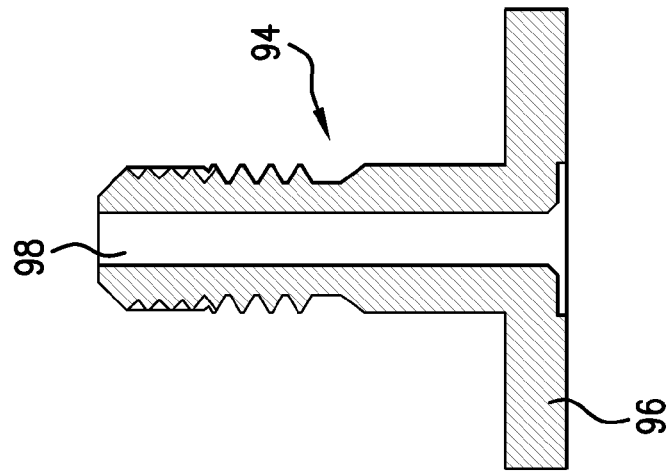
FIG. 4 is a cross-section view of an exemplary bleed/diaphragm sub screw for use in the valve of FIG. 1.

As arranged, the second pilot spring 86 acts to bias the bleed seat 80 upward toward the diaphragm 26. A bleed/diaphragm sub-screw 94 (see FIG. 4) is positioned between the diaphragm 26 and the bleed screw 80, and may itself have a flange portion 96 arranged to engage a top surface of the seal member 92. On an end of the bleed/diaphragm sub-screw 94 opposite the flange portion 96, the sub-screw is fixed to the second pressure plate 24 via a threaded nut 99. The bleed/diaphragm sub-screw 94 further has a central bore 98 for providing fluid communication between the inner chamber region 64 of the pilot spring chamber assembly 6 and the inner volume 100 of the spring chamber 20 when the flange portion 96 and the seal member 92 are disengaged.

Thus arranged, the bleed/diaphragm sub-screw 94 moves up and down with the pressure plate 24 and diaphragm 26 as the pressure plate and diaphragm move up and down. The bleed seat 80 and pusher post 28 are movable upward in response to the bias of the second pilot spring 86, and are movable downward in response to downward movement of the bleed/diaphragm sub-screw 94. As will be described in greater detail later, the bleed seat 80 and pusher post 28 are limited in their upward movement by engagement of the pusher post elastomeric ring 78 with an opposing surface 79 of the top chamber 14. Thus, the bleed seat 80 and pusher post 28 are separable from the bleed/diaphragm sub-screw 94 during certain operations of the valve 1. This separability provides for selective opening and closing of the central bore 98 to thereby open and close the fluid path between the inner chamber region 64 of the pilot spring chamber assembly 6 and the inner volume 100 of the chamber 20.

General operation of the valve 1 will now be described. A tension adjustment screw 85 (FIG. 8) is adjusted to achieve a desired downstream pressure (the set point). The pressure plate assembly 16 is initially driven open by the inlet pressure, which compresses the spring 18 and allows high capacity flow to pass from the inlet port 8, past the seat 12, and to the outlet port 10 since the spring 18 and low pressure in the intermediate chamber region 58 offers little resistance to closing the seat 12. As the downstream pressure approaches the set pressure, the spring chamber assembly 20 senses the downstream pressure via the sense port 66 of the pressure path 62. Because the pressure path 62 is in fluid communication with the inner chamber region 64 of the spring chamber assembly 6 via pressure path 62, the downstream pressure is applied to the underside of the diaphragm 26.

When the pressure under the diaphragm 26 reaches the valve's set point, the pilot spring 22 compresses and the diaphragm 26 rises, carrying with it the pusher post 28, the bleed seat 80 and the bleed/diaphragm sub-screw 94. The pusher post seal 78 closes off the flow path of inlet pressure between the intermediate chamber region 58 and the annulus 68. Thereafter, the intermediate chamber region 58 fills with increased pressure via fluid flow through the orifice 56 in the pressure plate 50. This flow serves to equalize the pressure across the pressure plate 50 and allows the first pressure spring 18 to move the pressure plate 50 and disc 44 toward the seat 12, reducing flow. In this way, the opening (defined between the seat 12 and the disc 44) between the inlet and outlet ports is throttled down, thus regulating pressure.

Figure 8:
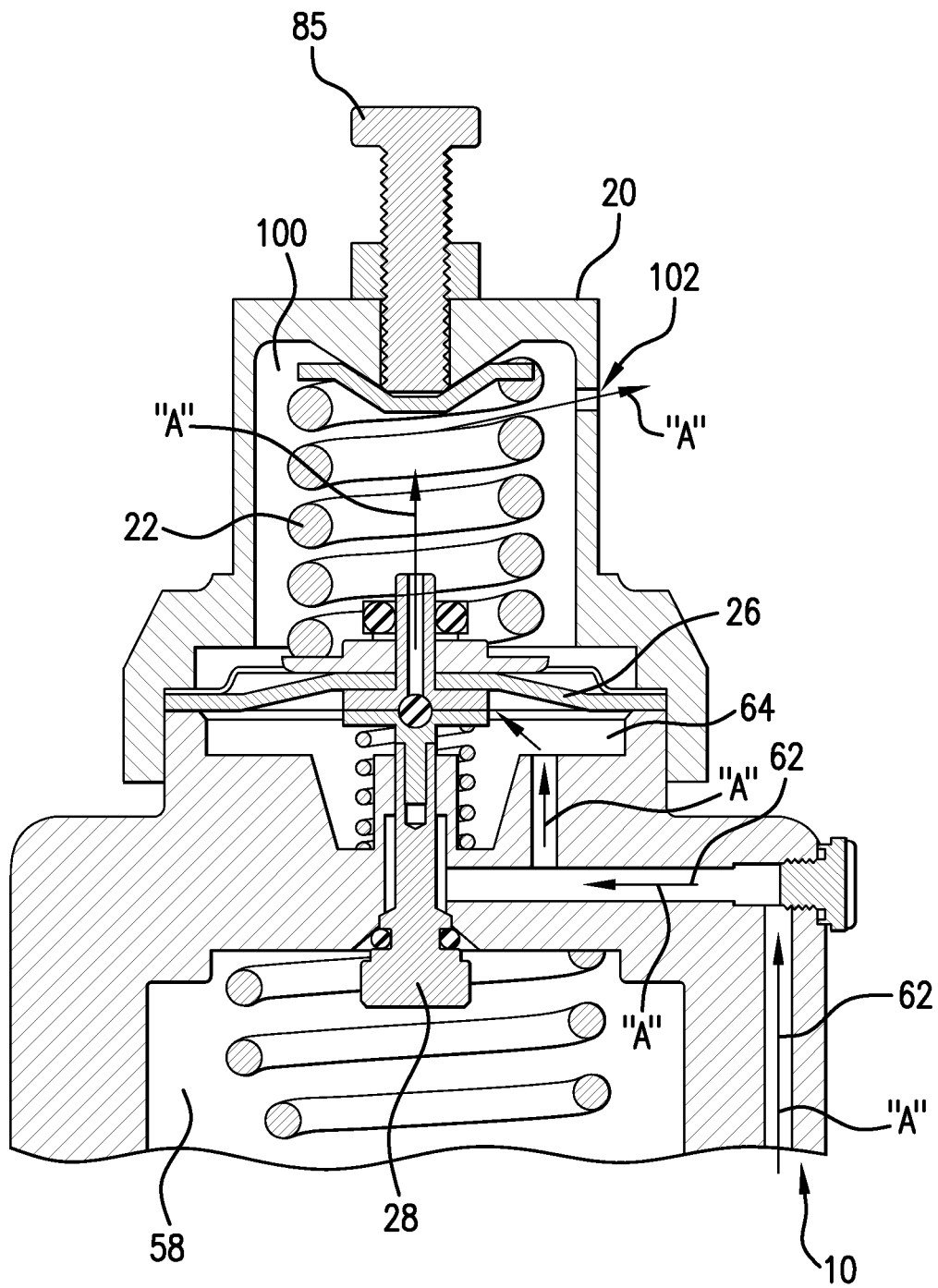
FIG. 8 is a cross section view of the valve of FIG. 1, illustrating an exemplary flow path of the disclosed self-relief mechanism.

Referring to FIG. 8, operation of the self-relief mechanism will now be described in greater detail. Specifically, FIG. 8 shows the flow path (generally shown as arrow "A") of relieving gas from the downstream (i.e., outlet) side of the valve. As previously described, this self-bleeding mechanism accomplishes bleeding off of excessive downstream pressures (i.e., pressures above the set pressure) by decoupling the pusher post 28 from the remainder of the pilot diaphragm sub assembly.

Inlet pressure is initially applied to the inlet port 8 (FIG. 2) of the valve 1 (e.g., when the inlet isolation valve is opened to bring the valve 1 on line). This inlet pressure pushes up the pressure plate 16 (FIG. 2). Residual flow passes by the pusher post 28, which is in a downward position and so is not yet sealed to the top chamber 14. This residual flow passes through the annulus 68 around the pusher post 28 and travels upward to feed flow to the cavity 64 under the diaphragm 26. The pusher post 28, bleed seat 80 and seal member 92 travel upward due to the bias of the second pilot spring 86 until the elastomeric ring 78 seals against the opposing surface 79 of the top chamber, and the pressure plate 16 shuts. At a pressure approximately equal to the pilot valve set point, the pusher post (and bleed seat) stop traveling up. At this point, the pusher post 28 and bleed seat 80 are at their highest position.

Also in this position, downstream pressure is applied below the diaphragm 26 via pressure path 62. The application of this downstream pressure to the inner chamber region 64 of the spring chamber assembly 6 causes the diaphragm 26 and bleed/diaphragm sub-screw 94 to lift move upward (the position shown in FIG. 8), and lift off the seal member 92, which is captured by the bleed seat 80. Once the bleed/diaphragm sub-screw 94 and seal member 92 disengage, the central bore 98 of the sub-screw 94 is exposed to the chamber region 64 and pressure in the chamber region 64 is relieved through the central bore 98, which feeds flow into the inner volume 100 of the spring chamber 20 and out a hole 102 in the wall of the spring chamber 20. Once the pressure is relieved through this hole 102, the diaphragm 26 and bleed/diaphragm sub-screw 94 move back downward under pressure of the pilot spring 22 until the sub-screw 94 again engages the seal member 92, sealing the central bore 98 and blocking flow between the chamber region 64 and the spring chamber 22.

In one non-limiting exemplary embodiment, the hole 102 in the spring chamber 20 is about 0.090 inches in diameter, the central bore 98 is about 0.090 inches in diameter, the pressure path 62 is about 0.090 inches in diameter, and the inner diameter of the sense tube 66 is about 0.076 inches. In an alternative embodiment, the inside diameter of each of these elements is about 0.159 inches.

Figure 9:
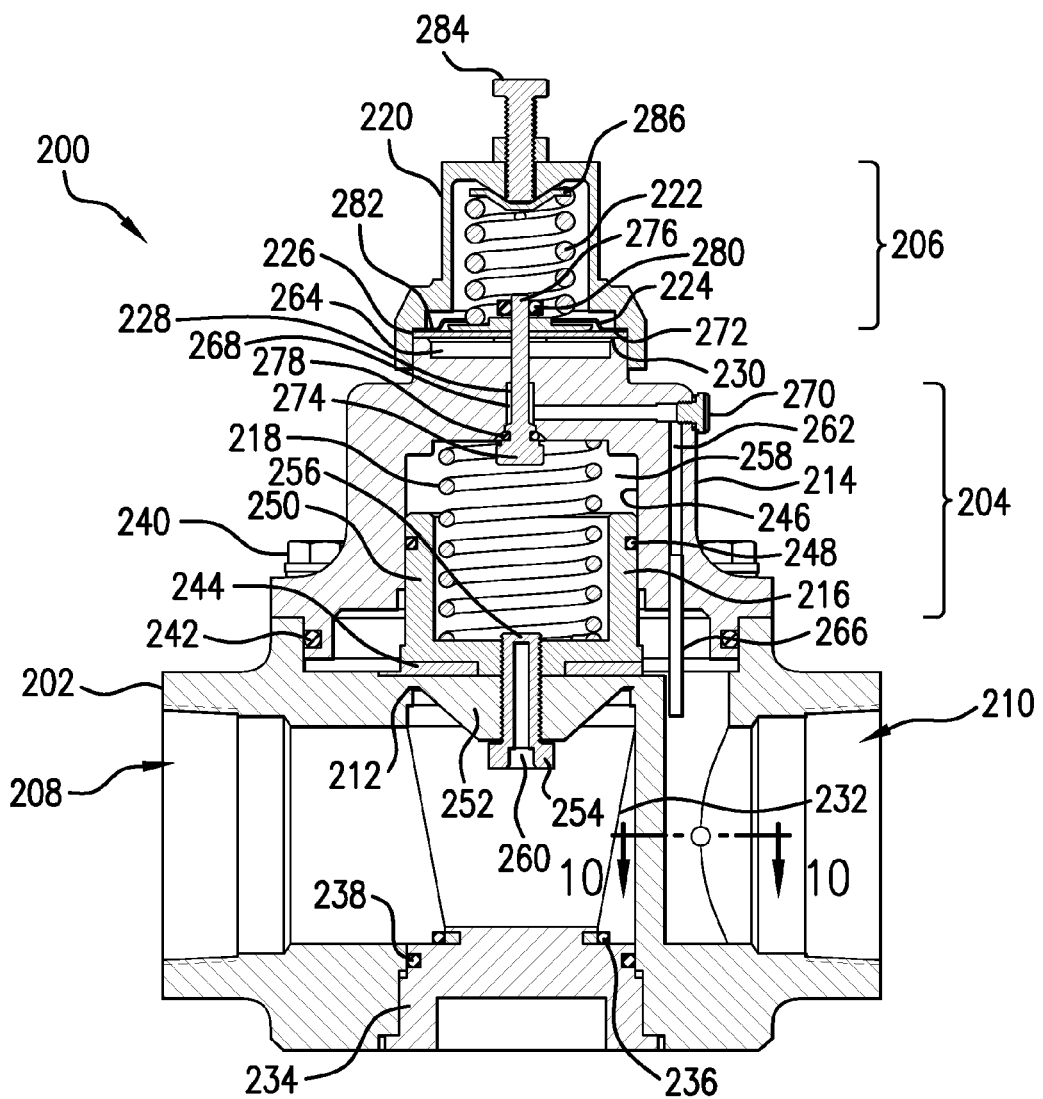
FIG. 9 is a cross section view of an alternative embodiment of the disclosed valve.

Referring now to FIG. 9, an alternative embodiment of a pressure regulating valve 200 is shown. The disclosed valve 200 comprises a body 202, a top chamber assembly 204, and a pilot spring chamber assembly 206. The body 202 generally comprises inlet and outlet ports 208, 210, and a seat 212. The top chamber assembly 204 generally comprises a top chamber 214, a main pressure plate subassembly 216 and a pressure spring 218, where the pressure spring 218 is positioned to bias the pressure plate subassembly 216 into engagement with the seat 212. The pilot spring chamber assembly 206 generally comprises a pilot spring chamber 220, a pilot spring 222, a second pressure plate 224, a diaphragm 226, and a pusher post 228. The pilot spring 222 is positioned to bias the second pressure plate 224 and diaphragm 226 against a support region 230 located near the top of the top chamber 214, and to maintain the pusher post 228 in a desired position with respect to the top chamber assembly.

The body 202 may also include a strainer screen 232 to minimize the entry of foreign material near the seat 212. To allow easy removal and cleaning of the strainer screen 232, a removable plug 234 may be provided in the body directly beneath the strainer screen. The plug 234 may be externally threaded to engage cooperating threads of the body 202. An elastomeric washer 236 may be provided at the connection between the screen 232 and plug 234 to prevent the unwanted passage of fluid between the screen and plug. An elastomeric o-ring 238 provided between the plug 234 and body 202 prevents leakage past the threads during operation. The inlet and outlet ports 208, 210 of the body 202 may be configured as desired (e.g., threaded, brazed, welded) to enable sealed connection with associated piping system components.

The top chamber assembly 204 is positioned on the body 202, and is held in sealed engagement with the body via a plurality of cap screws 240 and an o-ring 242. The main pressure plate subassembly 216 is vertically movable within the top chamber 214 to enable a disc 244, positioned at one end of the subassembly, to move into and out of engagement with the seat 12 on the body 202. The main pressure plate subassembly 216 may be sealed to an inner surface 246 of the top chamber 214 via one or more o-rings 248 disposed within a circumferential groove in the pressure plate 250. As noted, a disc 244 is mounted to one end of the pressure plate 250. In addition, a cone washer 252 may be provided at the same end of the pressure plate 250, and may be fixed to the pressure plate via cap screw 254. For reasons that will be explained further below, the cap screw 254 may have an orifice 256 configured to enable controlled fluid communication between the inlet port 208 of the body 202 and an intermediate chamber 258 of the top chamber assembly 204. A filter element 260 may be provided in the cap screw 254 to prevent debris from clogging the orifice 256. The cap screw 254 and filter element 260 can be provided as separate pieces from the orifice 256 to enable easy cleaning in case of clogs, and also to enable the user to change orifice sizes as desired.

The top chamber assembly 204 may further include a pressure path 262 that provides fluid communication between the outlet port 210 of the body 202 and an inner chamber region 264 of the pilot spring chamber assembly 206. A first end of the pressure path 262 may include a sense port 266 that extends downward into the body 202 adjacent to the outlet port 210. A second end of the pressure path 262 terminates in an annulus 268 that surrounds a portion of the pusher post 228 which is disposed within the top chamber 214. A plug 270 is threaded into a portion of the pressure path 262 to seal the path from the outside environment.

The pilot spring chamber assembly 206 is positioned on the top chamber assembly 204, and the two are held in engagement via a threaded connection 272. As previously noted, the second pressure plate 224, diaphragm 226, and pusher post 228 are vertically movable within the spring chamber 220. A first portion 274 of the pusher post 228 resides within the intermediate chamber 258 of the top chamber assembly 204, while a second portion 276 resides within the spring chamber 220. An elastomeric ring 278 is positioned on a shoulder region of the first portion 274 of the pusher post 228, to enable selective sealing of the annulus 268 and the intermediate chamber 258. The second portion 276 is fixed to the second pressure plate 224 via a threaded nut 280. Thus, as the pressure plate 224 and diaphragm 226 move up and down, the pusher post 228 is moved into and out of sealed engagement with the annulus 268.

An annular diaphragm stop 282 may be positioned above the diaphragm 226 to prevent over-extension of the diaphragm during operation. The spring chamber assembly 206 may additionally include a tension adjustment screw 284 threadably mounted to a top of the spring chamber 220. The tension adjustment screw 284 engages the pilot spring 222 via a plate 286, enabling a user to adjust the amount of force required to compress the spring 222 in operation, which in turn, adjusts the pressure at which the pusher post 228 seals the annulus 268 from the intermediate chamber 258 of the top chamber assembly 204.

In operation, the tension adjustment screw 284 is adjusted to achieve a desired downstream pressure (i.e., set point). The pressure plate assembly 216 is initially driven open by the inlet pressure, which compresses the spring 218 and allows high capacity flow to pass from the inlet port 208, through the seat 212, and to the outlet port 210 as the spring 218 and low pressure in the intermediate chamber 258 offers little resistance to closing the seat 212. As the downstream pressure approaches the set pressure, the spring chamber assembly 220 senses the downstream pressure via the sense port 266 of the pressure path 262. Because the pressure path 262 is in fluid communication with the inner chamber region 264 of the spring chamber assembly 206 via pressure path 62, the downstream pressure is applied to the underside of the diaphragm 226.

When the pressure under the diaphragm 226 reaches the set point, the pilot spring 222 compresses and the diaphragm 226 rises, carrying the pusher post 228 with it. Upward movement of the pusher post 228 seals off the flow path of inlet pressure between the intermediate chamber 258 and the annulus 268. Thereafter, the intermediate region 258 fills with increased pressure via fluid flow through the orifice 256 in the pressure plate 250. This flow serves to equalize the pressure across the pressure plate 250 and allows the first pressure spring 218 to move the pressure plate 250 and disc 244 toward the seat 212, reducing flow. In this way, the opening (defined between the seat 212 and the disc 244) between the inlet and outlet ports is throttled down, regulating pressure.

It will be appreciated that the knob 270, bottom plug 234 and strainer/screen 232 are optional, and are not critical to the operation of the disclosed valve 200. Likewise, the cone washer 252, which is disposed beneath the disc 244, may in some applications serve to reduce flow oscillations during throttling, thus resulting in smoother throttling. While an enhancement, the cone washer 252 also is not considered to be critical to the design.

Figure 10:
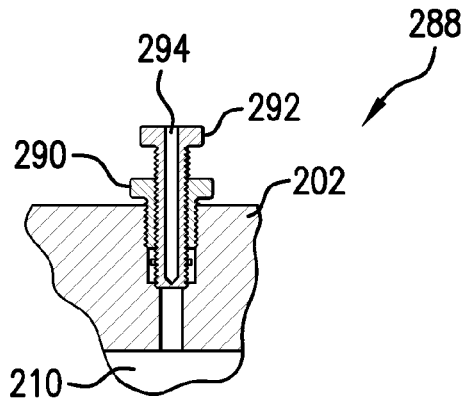
FIG. 10 is a cross section view of the valve of FIG. 9, taken along line 10-10.

Referring to FIG. 10, a bleed screw assembly 288 is shown positioned within a wall of the body 202 adjacent the downstream port 210. The bleed screw assembly 288 consists of a plug 290 having external threads for threading into a port in the body 202, and internal threads for receiving a threaded bleed screw 292. As can be seen, the bleed screw 292 has an internal passage 294 for allowing selective fluid communication between the downstream port 210 of the body 202 and the outside environment to bleed excess pressure above set to atmosphere.

The disclosed valve 200 is expected to provide up to 2000 scfm flow for 2" and 1½" nominal connections requiring 2000 scfm, with approximately 20% droop with as little as 10 psi differential pressure across the valve. Other nominal sizes and flow rates are expected to be achievable via appropriate component scaling. Spring constants for the springs 218, 222, should be selected for the particular application to provide the desired set point and to ensure smooth operation of the valve 1. In one non-limiting exemplary embodiment, the orifice 256 in the cap screw 254 may have a diameter of about 0.022-inches. It will be appreciated, however, that other orifice sizes can be used as desired.

The individual components of the disclosed device may be constructed of any of a variety of materials appropriate for the intended application, taking into consideration the temperature and pressure ratings of the application, the flow rates desired, as well as the operating fluid. In an exemplary embodiment, the body, top chamber and spring chamber may be constructed of aluminum. The springs may be constructed of steel or stainless steel. Internal components may be constructed of stainless steel, bronze and/or brass. Sealing components such as o-rings, discs, the seal members and the diaphragm may be constructed of an appropriate polymeric and/or elastomeric material such as neoprene, nylon, viton, buna, or the like.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A pressure regulating valve, comprising:
a pressure regulating portion comprising a body having an inlet port and an outlet port, a valve seat, a valve disc, and an intermediate chamber enclosing a first spring for biasing the valve disc into engagement with the valve seat; and
a pilot portion positioned on the pressure regulating portion, the pilot portion comprising:
a pilot spring, a diaphragm, a pusher post axially fixed to a bleed-seat, a sub-screw having an axial bore, the sub-screw axially fixed to the diaphragm; and
a seal member disposed between the bleed-seat and the sub-screw;
the body including a pressure path for fluid communication between the outlet port and an inner chamber region disposed beneath the diaphragm,
a first end of the pressure path including a sense port that extends through the body adjacent to the outlet port,
a second end of the pressure path terminating in an annulus surrounding a portion of the pusher post, and
a third end of the pressure path terminating in the inner chamber region.

2. The pressure regulating valve of claim 1, wherein the pilot portion has a first position in which the pusher post enables flow between the outlet port, the annulus and the intermediate chamber, a second position in which the pusher post prevents flow between the outlet port and the intermediate chamber, a third position in which the diaphragm and sub-screw move upward in response to fluid pressure applied to the inner chamber region via the pressure path, and a fourth position in which the sub-screw disengages from the seal member to open the axial bore to the inner chamber region, thereby enabling fluid flow from the inner chamber region through the axial bore and into a pilot chamber for release via a hole in the pilot chamber.

3. The pressure regulating valve of claim 1, comprising an o-ring disposed about a shoulder region of the pusher post for selective sealing of the annulus and the intermediate chamber.

4. The pressure regulating valve of claim 1, the valve disc further including an orifice to enable controlled fluid communication between the inlet port and the intermediate chamber.

5. The pressure regulating valve of claim 1, the seal member comprising a cylindrical element or a spherical element.

6. The pressure regulating valve of claim 5, wherein the seal member comprises a polymer having a hardness that enables the seal member to conform to the contours of the bleed seat and the sub-screw.

7. The pressure regulating valve of claim 1, the seal member comprising an elastomeric ball captured within a recess in the bleed seat.

8. The pressure regulating valve of claim 1, the bleed seat threadably engaged with a recess of the pusher post.

9. The pressure regulating valve of claim 1, comprising a pressure plate disposed between the pilot spring and the diaphragm.

10. A pressure regulating valve, comprising:

a pressure regulating portion including a body having an inlet port and an outlet port, a valve seat, a valve disc, and an intermediate chamber enclosing a first spring for biasing the valve disc into engagement with the valve seat; and a pilot portion positioned on the pressure regulating portion, the pilot portion including
a pilot spring,
a diaphragm,
an annulus in selective communication with the intermediate chamber,
a pusher post axially fixed to a bleed-seat and at least partially positioned within the annulus,
a sub-screw having an axial bore, the sub-screw axially fixed to the diaphragm,
an intermediate chamber seal disposed about a shoulder region of the pusher post for selective sealing of the annulus and the intermediate chamber, and
a seal member disposed between the bleed-seat and the sub-screw;

the body including a pressure path for fluid communication between the outlet port and an inner chamber region disposed beneath the diaphragm.

11. The pressure regulating valve of claim 10, wherein a first end of the pressure path includes a sense port that extends through the body adjacent to the outlet port, a second end of the pressure path terminates in the annulus, and a third end of the pressure path terminates in the inner chamber region.

12. The pressure regulating valve of claim 11, wherein the pilot portion has a first position in which the pusher post enables flow between the outlet port, the annulus and the intermediate chamber, a second position in which the pusher post prevents flow between the outlet port and the intermediate chamber, a third position in which the diaphragm and sub-screw move upward in response to fluid pressure applied to the inner chamber region via the pressure path, and a fourth position in which the sub-screw disengages from the seal member to open the axial bore to the inner chamber region, thereby enabling fluid flow from the inner chamber region through the axial bore and into a pilot chamber for release via a hole in the pilot chamber.

13. The pressure regulating valve of claim 10, the valve disc further including an orifice to enable controlled fluid communication between the inlet port and the intermediate chamber.

14. The pressure regulating valve of claim 10, the seal member including a cylindrical element or a spherical element.

15. The pressure regulating valve of claim 14, wherein the seal member includes a polymer having a hardness that enables the seal member to conform to the contours of the bleed seat and the sub-screw.

16. The pressure regulating valve of claim 10, the seal member including an elastomeric ball captured within a recess in the bleed seat.

17. The pressure regulating valve of claim 10, the bleed seat threadably engaged with a recess of the pusher post.

18. The pressure regulating valve of claim 10, further comprising a pressure plate disposed between the pilot spring and the diaphragm.

* * * * *